June 2, 1925. 1,540,298
J. B. WHITE
SPRING BALANCE OR OTHER SELF INDICATING SCALE
Filed Aug. 9, 1922 4 Sheets-Sheet 2
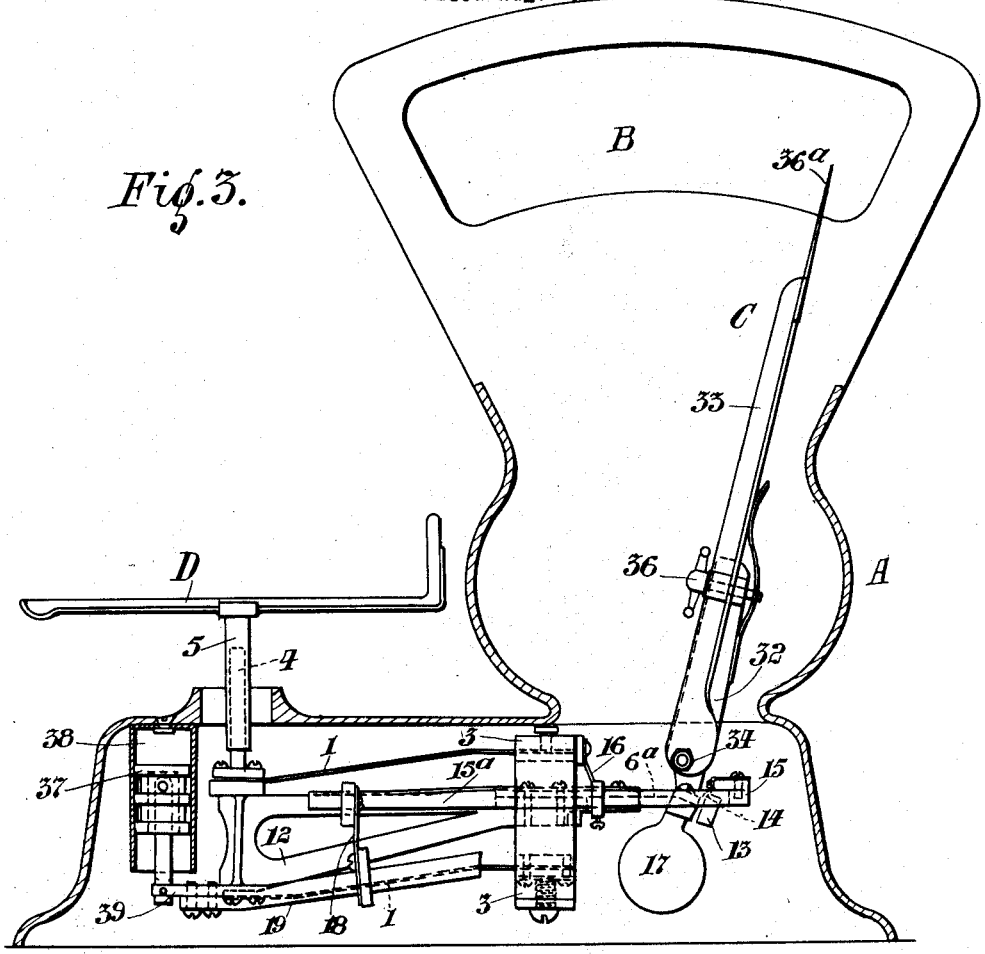
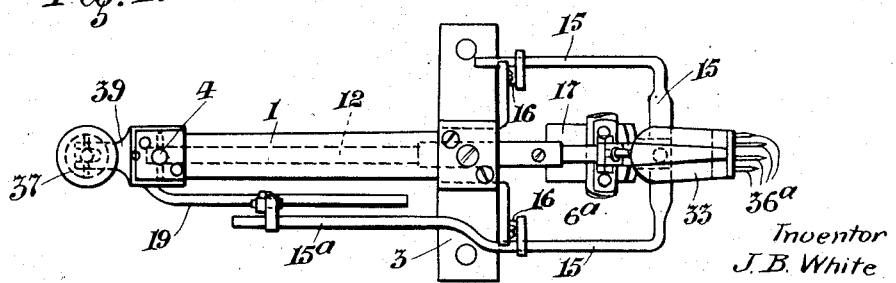
Inventor
J. B. White
by
Att'y June 2, 1925. 1,540,298
J. B. WHITE
SPRING BALANCE OR OTHER SELF INDICATING SCALE
Filed Aug. 9, 1922 4 Sheets-Sheet 3
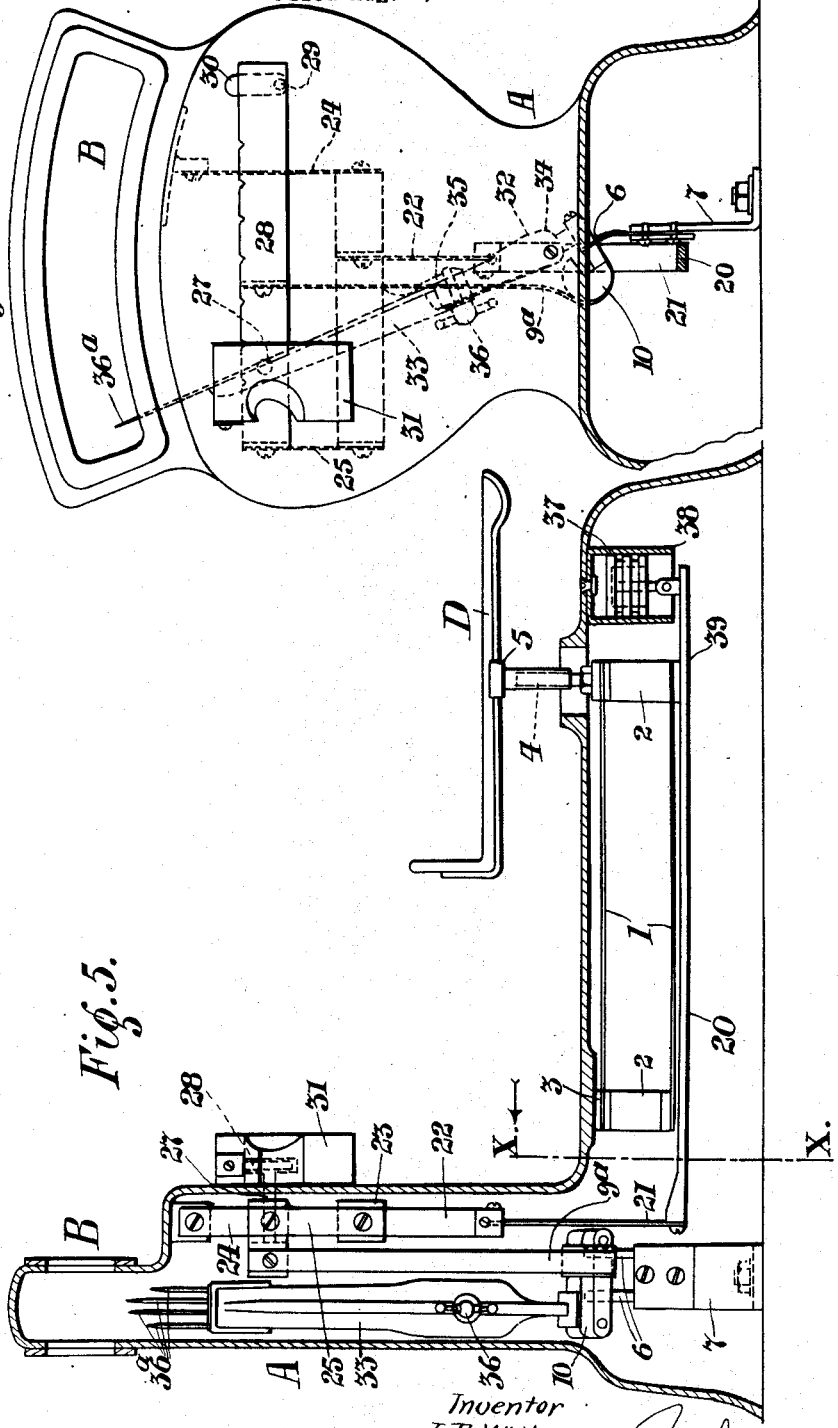
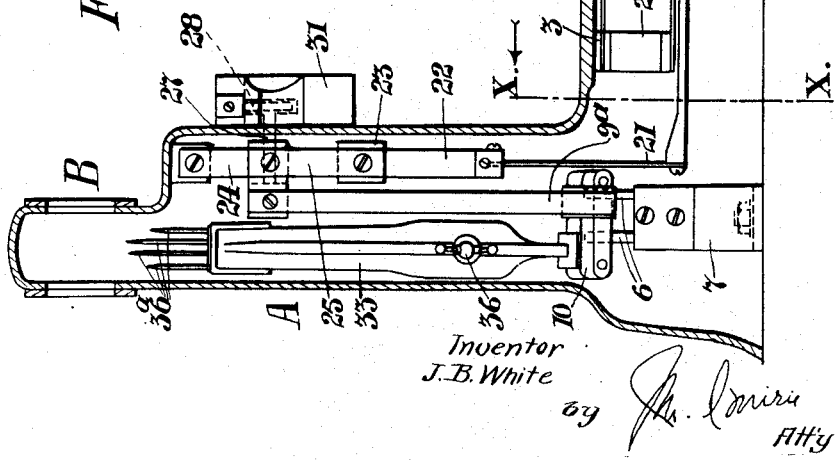
Inventor
J. B. White June 2, 1925. 1,540,298
J. B. WHITE
SPRING BALANCE OR OTHER SELF INDICATING SCALE
Filed Aug. 9, 1922 4 Sheets-Sheet 4
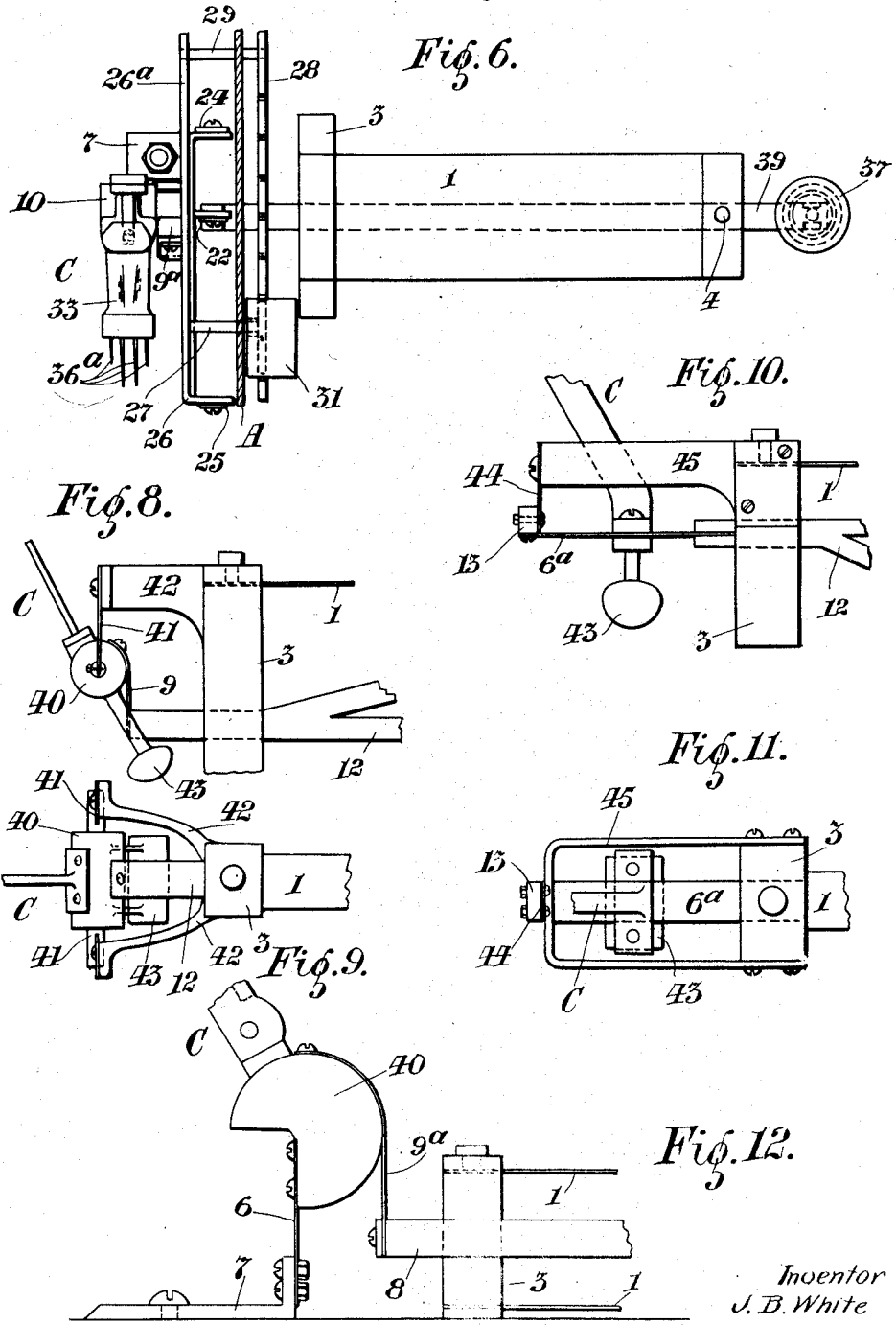
Inventor
J. B. White
by 
Att'y Patented June 2, 1925.

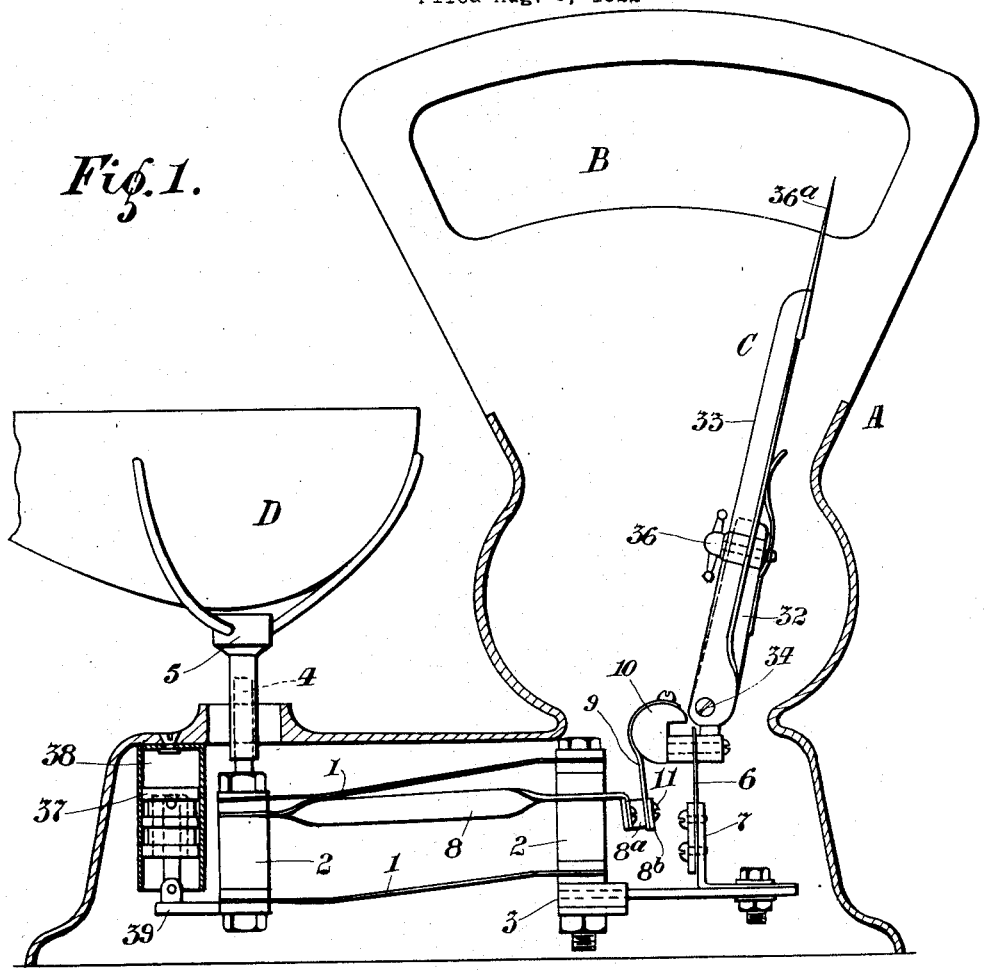
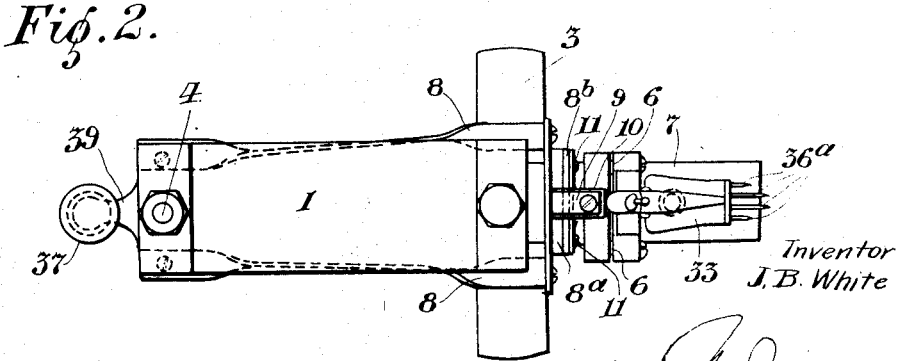

1,540,298

UNITED STATES PATENT OFFICE.

JOHN BROWN WHITE, OF GLASGOW, SCOTLAND, ASSIGNOR TO MAATSCHAPPIJ VAN BERKEL'S PATENT, OF ROTTERDAM, NETHERLANDS.

SPRING BALANCE OR OTHER SELF-INDICATING SCALE.

Application filed August 9, 1922. Serial No. 580,786.

*To all whom it may concern:*

Be it known that I, JOHN BROWN WHITE, of 41 King Street, Trongate, Glasgow, Scotland, a subject of the King of Great Britain, have invented certain new and useful Improvements in Spring Balances or Other Self-Indicating Scales, of which the following is a specification.

This invention relates to automatic or self-indicating weighing or price computing scales and its object is to provide a scale of improved and simplified construction, having highly sensitive yet durable and reliable mechanism.

A scale having a resilient weighing beam comprising leaf springs fixed at one end and supporting a scale pan at the other end has already been proposed but no provision was made for securing parallelism of the springs under load.

In accordance with the present invention the leaf springs of the weighing beam are secured with their extreme points of flexure in alignment so that they bend or yield in parallel under load preferably without increasing the distance (measured horizontally) between their ends and therefore without increasing leverage due to the load, and the motion of the weighing beam is transmitted to the indicator through a flexible or other connection such that the indicator makes equal movements for equal increase of load, thereby facilitating the graduation and the accurate reading of the scale.

Preferably the indicator is mounted and connected with the weighing beam by means of flexible members, free to flex laterally to permit the indicator to oscillate without friction and, in some cases, a compensating device, as hereinafter described, is introduced in order to maintain a constant centre of movement of the indicator and thus facilitate graduation of the weight indicating scale. The flexible connection between the weighing beam and the indicator may be such that its effective length can be readily adjusted to vary the setting of the indicator, thus providing a convenient means for initially setting or balancing the mechanism of the scale, and a fine adjustment is, or may be, provided for the indicator to facilitate the correct zero setting on the weight indicating scale. Attachments may be provided in conjunction with the flexible connection for varying the range of movement of the indicator as well as for adjusting its setting.

Constructional forms of automatic or self-indicating weighing scales and indicator-suspension mechanism or mountings in accordance with the invention are illustrated, by way of example, on the accompanying drawings, whereon:—

Fig. 1 is part sectional elevation of one form of the improved weighing scale, and Fig. 2 a corresponding plan of the mechanism detached.

Figs. 3 and 4 are views similar to Figs. 1 and 2 but of another form.

Figs. 5, 6 and 7 show still another form of the invention, Fig. 5 being a sectional elevation, Fig. 6 a plan of the mechanism and Fig. 7 a section through the scale on the line $x$—$x$ Fig. 5.

Figs. 8 and 9 show a modified indicator-suspension or mounting in elevation and plan respectively, and Figs. 10, 11 and 12 are views of further modifications.

Referring to the drawings, whereon the same reference letters and numerals wherever repeated indicate the same or similar parts:—

A denotes the casing of the weighing scale having an arcuate opening B through which the position of the weight indicator C, as determined by the load on the scale pan D, is seen relative to a weight indicating scale (not shown).

As illustrated in Figs. 1 and 2, the weighing beam comprises flat parallel leaf springs 1, 1 clamped at their ends with parallel distance pieces 2, 2 between them. The composite resilient beam thus formed is fixed at one end to the casing A by a bracket or bridge 3 while the other end is left free and carries a rod 4 on which rests the support 5 for the scale pan D. It is apparent that under a load placed on the scale pan the free end of the beam will move downwards with its fixed end as the fulcrum, this movement being permitted by the resiliency of the springs 1, 1. An important feature of the arrangement is that the distance measured horizontally between the ends of the springs is not increased and the springs and the distance pieces 2, 2, retain their relative parallel positions, also there is no increased leverage due to the load or its position on the pan D, which might cause errors in the indicated weight.

The indicator C is clamped on to light flexible strips 6, 6, extending vertically from a bracket 7 rigidly connected with the casing A, and the aforesaid downward movement of the weighing beam is transmitted to the indicator by means of a yoke 8 extending horizontally from the free end of the beam and attached by a flexible band 9 to an eccentric disc 10 forming a part of the indicator. When the free end of the weighing beam is depressed under a load placed on the scale pan, the yoke 8 is moved downwards thereby exerting a pull on the flexible band 9 which causes the indicator to make an arcuate movement over the weight indicating scale, this movement being permitted by the flexible strips 6, 6, which flex freely under the pull on the band.

In this form of the invention the flexible band 9 is clamped to a cross-piece 8ª of the yoke 8 by a plate 8ᵇ and screws 11, so that it is only necessary to loosen the screws in order to adjust the effective length of the band as required for initially setting or balancing the scale.

Referring now to Figs. 3 and 4, the weighing beam comprises parallel leaf springs fixed at their one ends as before, but in this case a triangular frame 12 replaces the distance piece 2 at the free end of the beam. This frame, which moves downwards with the beam, extends horizontally towards the indicator and carries a light flexible strip 6ª on to which the latter is clamped. The end of the strip 6ª remote from the frame 12 is connected to a block 13 suspended by a light flexible strip 14 from a yoke 15 which, in turn, is suspended by flexible strips 16, 16, from the fixed end of the weighing beam. The indicator is counter-weighted at 17 and normally assumes the position shown. When, however, the free end of the weighing beam and therefore the frame 12 move downwards, they are also displaced slightly to the right in Fig. 3 (due to the bending of the springs 1, 1) thereby flexing the spring suspension 6ª, 14 and causing the indicator to move angularly over the weight indicator scale an amount corresponding to the loading of the scale pan.

With this arrangement there is a tendency for the centre of movement of the indicator to be displaced downwards and to the right in Fig. 3 and in order to avoid such displacement a compensating device is employed said device comprising an extension 15ª of the yoke 15 connected by a flexible member 18 to an arm 19 on the frame 12. As the frame 12 moves downwards the arm 19 exerts a pull on the extension 15ª which turns the yoke 15 about the strips 16, 16 as the fulcrum and thus counteracts or neutralizes the displacement of the indicator under the downward and horizontal displacement of the frame 12, so that the centre of movement of the indicator remains constant. The amount of the compensating movement is determined by the position of the flexible member 18 which is adjustable along the extension 15ª and the arm 19.

Figs. 5, 6 and 7 illustrate a form of the weighing apparatus adapted for weighing quantities beyond the range of the weight indicating scale provided. As before, the scale pan D is supported by a resilient weighing beam comprising parallel leaf springs 1, 1 but movement of the free end of the beam is transmitted to a steelyard lever through a connection now to be described. 20 indicates a horizontal arm movable with the free end of the beam and connected, at its other end, through the medium of flexible members 21, 22 arranged at right angles to each other, with a horizontal lever 23 suspended at its one end from the casing A by a flexible suspension strip 24 and attached, at its other end, by a flexible strip 25, to a steelyard lever 26, 26ª (Fig. 6) pivoted at 27 to the casing. Outside the casing is a graduated steelyard arm 28 rigidly connected with the steelyard lever 26, 26ª by the pivot 27 and by a pin 29 passing through a slot 30 (Fig. 7) in the casing A. Depression of the free end of the weighing beam causes the arm 20 to exert a pull on the members 21, 22, to turn the lever 23 about the end suspended by the strip 24, thereby turning the lever 26, 26ª and the arm 28 about the pivot 27. Slidable on the arm 28 is a weight 31 and, it will be apparent that when the weight is moved to the right from the position shown the leverage or turning moment due to the same must be overcome by the load on the scale pan D before the weighing beam is depressed to operate the indicator C. The leverage or turning moment is, of course, varied as required by sliding the weight along the graduated arm.

The indicator C is mounted on vertically arranged flexible members 6, 6, as already described with reference to Figs. 1 and 2 but the eccentric disc 10 is connected by a flexible band 9ª to the arm 26ª of the steelyard so as to operate the indicator as the steelyard lever turns about its pivot 27.

In each of the three forms of weighing apparatus described the indicator C is shown as comprising an arm 32 to which a pointer 33 is pivoted at 34. A leaf spring 35 at the free end of the arm bears against the pointer and acts in opposition to an adjusting screw 36. By turning the screw in one direction or the other the pointer is moved about its pivot 34 towards or away from the arm thus providing a fine adjustment for obtaining the correct zero setting on the weight indicating scale. At its upper end the pointer terminates in four indexes 36ᵃ two of which are arranged on either side of the weight indicating scale. By having a double index on each side of the index scale the line of vision is easily brought correctly on to the weight indicated, this being accomplished when both indexes appear as one.

A known form of damping device 37, 38, is shown in conjunction with the weighing beam for the purpose of damping vibration. The piston 37 is attached to an arm 39 extending from the free end of the weighing beam and the cylinder 38 is secured to the casing.

If desired, the indicator suspension or mounting illustrated by Figs. 8 and 9 may be used in lieu of the forms of suspension hereinbefore described. In this case the indicator is secured to a drum 40 suspended by means of a vertically arranged flexible strip 41 depending from a bifurcated extension 42 of the bridge or bracket 3 and free to flex laterally. The indicator, which is counter-weighted at 43, has the drum 40 connected by a flexible band 9 to the part 12 of the weighing mechanism in a similar manner to that described with reference to Figs. 1 and 2.

In the arrangement according to Figs. 10 and 11 the indicator suspension or mounting is similar to that seen in Figs. 3 and 4 but without the compensating device. The indicator, which is counter-weighted at 43, is clamped to the flexible strip 6ᵃ attached at one end to the frame 12 of the weighing mechanism and at the other end to the block 13. In this case the block 13 is suspended from a yoke 45 fixed on the bridge or bracket 3 by a strip 44 capable of flexing laterally. The centre of movement of the indicator will not remain constant when the weighing mechanism is in operation but its displacement is so slight as to be of no importance for most ordinary requirements.

The arrangement shown in Fig. 12 is a modification of the indicator setting means shown in Figs. 1 and 2, and comprises a flexible member 9ᵃ adjustably attached at one end to the indicator eccentric 40 and adjustably or otherwise secured at the other end to the yoke 8. The indicator is mounted on flexible members 6 attached to the bracket 7 as in Fig. 1. By adjusting the position of the end of the member 9ᵃ which is secured to the yoke 8 the range of movement of the indicator can be varied as well as its setting for zero.

It is found in practice that when a scale constructed in accordance with the invention as herein described is moved slightly off the level the accuracy of the weighing mechanism is not affected to the same extent as in self-indicating scales of ordinary construction. Further, the absence of knife-edge bearings, rack and pinion gearing and similar friction producing parts renders the mechanism very sensitive and accurate in use. I prefer to eliminate such friction producing parts altogether but I may use in conjunction with the resilient weighing beam an indicator mounted in known manner on knife edges and connected by a flexible band with the weighing beam.

Whilst I have shown my invention as applied to weighing or price computing scales of the so called quadrant type it is also applicable to scales having circular weight indicating dials or drums, as will be apparent to those skilled in the art.

Having now fully described my invention what I claim and desire to secure by Letters Patent is:—

1. A self-indicating weighing machine having weighing and indicating mechanism comprising a resilient weighing beam built up of parallel leaf springs secured at one end with their extreme points of flexure in vertical alignment, load supporting means connecting the other ends of said springs, a fixed scale, an indicator mounted for oscillation with respect to said scale on a member free to flex laterally, and a flexible connection between said load supporting means and said indicator.

2. A self-indicating weighing machine having weighing and indicating mechanism comprising a resilient weighing beam built up of parallel leaf springs secured at one end with their extreme points of flexure in vertical alignment, load supporting means connecting the other ends of said springs, a fixed scale, a flexibly supported indicator mounted for oscillation with respect to said scale, and a flexible connection capable of adjustment between said load supporting means and said indicator.

3. A self-indicating weighing machine having weighing and indicating mechanism comprising a resilient weighing beam built up of parallel leaf springs secured at one end with their extreme points of flexure in vertical alignment, load supporting means connecting the other ends of said springs, a fixed scale, an indicator mounted for oscillation with respect to said scale on a member free to flex laterally, and a flexible connection capable of adjustment between said load supporting means and said indicator.

4. A self-indicating weighing machine, comprising a casing, a scale carried by said casing, a bracket within the casing, a flexible member carried by said bracket, an indicator arm clamped to said flexible member for oscillation with respect to said scale, a pointer adjustably carried by said arm, a resilient weighing beam built up of parallel leaf springs secured within the casing at their one ends and connected by scale supporting means at their other ends, an extension carried by said weighing beam, and a flexible connection between said extension and said indicator arm.

5. A self-indicating weighing machine, comprising a casing, a scale carried by said casing, a bracket within the casing, a flexible member carried by said bracket, an indicator arm clamped to said flexible member for oscillation with respect to said scale, a pointer adjustably carried by said arm, a resilient weighing beam built up of parallel leaf springs secured within the casing at their one ends and connected by scale supporting means at their other ends, an extension carried by said weighing beam, a flexible connection between said extension and said indicator arm, and means whereby the effective length of said connection can be varied.

6. A self-indicating weighing machine having weighing and indicating mechanism comprising a resilient weighing beam built up of parallel leaf springs secured at one end with their extreme points of flexure in vertical alignment, load supporting means connecting the other ends of said springs, a fixed scale, an indicator mounted for oscillation with respect to said scale, a flexible connection between said resilient weighing beam and said indicator, and means for adjusting the zero setting of said indicator on said scale.

7. A self-indicating weighing machine having weighing and indicating mechanism comprising a resilient weighing beam built up of parallel leaf springs secured at one end with their extreme points of flexure in vertical alignment, load supporting means connecting the other ends of said springs, a fixed scale, an indicator mounted for oscillation with respect to said scale on a member free to flex laterally, a flexible connection between said resilient weighing beam and said indicator, and means for adjusting the zero setting of said indicator on said scale.

8. A self-indicating weighing machine, comprising a casing, a scale carried by said casing, an indicator mounted in said casing for oscillation with respect to said scale, a resilient weighing beam built up of parallel leaf springs secured within the casing at their one ends and connected by load supporting means at their other ends, a graduated arm pivoted in the casing, a weight slidable on said arm, a flexible connection between said weighing beam and said arm, and a flexible connection between said arm and said indicator.

9. A self-indicating weighing machine, having an indicator, a flexible strip for directly supporting said indicator, a resilient weighing beam, a load supporting means carried by the free end of said beam, and an operating connection between said load supporting means and indicator made up in part of a flexible member.

10. A self-indicating weighing machine having a flexible supported indicator, a resilient weighing beam, comprising parallel leaf springs fixed at one end with their extreme points of flexure in vertical alignment, load supporting means connecting the other ends of said springs, a member secured to said load supporting means and extending therefrom toward the indicator, and a flexible strip connecting said member and indicator, said member extending between the parallel leaf springs.

11. A self-indicating weighing machine, having a weighing beam made up of parallel leaf springs, a load supporting means connecting said springs at one end, an indicator, a rigid operating connection extending from said load supporting means and lengthwise said springs, and a flexible member secured to said operating connection and to the indicator.

12. A self-indicating weighing machine, having a weighing beam made up of parallel leaf springs, a load supporting means connecting said springs at one end, an indicator supported on flexible strips, a rigid operating connection extending from said load supporting means and lengthwise said springs, and a flexible member secured to said operating connection and to the indicator.

13. A self-indicating weighing machine, having a weighing beam made up of parallel leaf springs, a load supporting means connecting said springs at one end, an indicator, a rigid operating connection extending from said load supporting means and disposed lengthwise said springs, a flexible member secured to said operating connection and to the indicator, and an eccentric disc carried by the indicator over which said strip passes.

14. A self-indicating weighing machine, having a weighing beam made up of parallel leaf springs, a load supporting means connecting said springs at one end, an indicator supported on flexible strips, a rigid operating connection extending from said load supporting means and disposed lengthwise said springs, a flexible member secured to said operating connection and to the indicator, and an eccentric disc carried by the indicator at one side of the flexible strip support over which the flexible strip from said operating connection extends.

15. A self-indicating weighing machine having a flexibly supported indicator, a resilient weighing beam, a load supporting means carried by the free end of the beam, an operating connection between said load supporting means and indicator and disposed lengthwise said springs, and a flexible band extending from said operating connection and having an eccentric operating path relative to the indicator.

16. A self-indicating weighing scale, comprising a resilient weighing beam built of parallel leaf springs secured at one end with their extreme points of flexure in vertical alignment, load supporting means connecting the other ends of said springs, an indicator, a flexible member supporting the indicator, and means connecting said indicator with the load supporting means, said connecting means being made up in part of a flexible member.

In testimony whereof I affix my signature in presence of two witnesses.

JOHN BROWN WHITE.

Witnesses:
F. BEES,
C. C. EVANS.